(12) United States Patent
Frizzell et al.

(10) Patent No.: US 12,472,773 B2
(45) Date of Patent: Nov. 18, 2025

(54) CASTER ASSEMBLIES HAVING CAM-OPERATED BRAKES

(71) Applicant: The Boeing Company, Arlington, VA (US)

(72) Inventors: Matthew James Frizzell, Ballwin, MO (US); Richard Kurt Wagner, Crestwood, MO (US); Joseph Edward Flach, St. Charles, MO (US)

(73) Assignee: The Boeing Company, Arlington, VA (US)

( * ) Notice: Subject to any disclaimer, the term of this patent is extended or adjusted under 35 U.S.C. 154(b) by 407 days.

(21) Appl. No.: 18/170,939

(22) Filed: Feb. 17, 2023

(65) Prior Publication Data

US 2024/0278599 A1 Aug. 22, 2024

(51) Int. Cl.
*B60B 33/02* (2006.01)
*B60B 33/00* (2006.01)

(52) U.S. Cl.
CPC ........ *B60B 33/021* (2013.01); *B60B 33/0081* (2013.01)

(58) Field of Classification Search
CPC .................................................. F16D 63/006
See application file for complete search history.

(56) References Cited

U.S. PATENT DOCUMENTS

| 3,493,085 | A | * | 2/1970 | Libhart | ............... B60B 33/0078 188/74 |
| 4,349,937 | A | * | 9/1982 | Fontana | ............... B60B 33/021 16/35 R |
| 11,207,917 | B1 | * | 12/2021 | Lin | ....................... B62B 5/0433 |
| 2013/0111664 | A1 | * | 5/2013 | Childs | .................. B60B 33/026 280/80.1 |
| 2022/0212908 | A1 | | 7/2022 | Frizzell et al. | |

FOREIGN PATENT DOCUMENTS

| CN | 205172431 U | * | 4/2016 | |
| DE | 4412603 C2 | * | 6/1996 | ......... B60B 33/0039 |
| TW | 570986 B | * | 1/2004 | |

* cited by examiner

*Primary Examiner* — Melody M Burch
(74) *Attorney, Agent, or Firm* — Hanley, Flight & Zimmerman, LLC

(57) ABSTRACT

Caster assemblies are disclosed herein. An example caster assembly includes a caster frame assembly including a caster frame, a caster mounting plate, and a brake arm; a pin having a first end and a second end opposite the first end, the second end to engage the brake arm; and a lever arm having a third end and a fourth end opposite the third end, the lever arm to pivot relative to the caster frame assembly between a first position and a second position, movement of the lever arm to the first position to cause the fourth end of the lever arm to actuate the pin in a first direction to move the brake arm to the engaged position to restrict rotation of the wheel.

20 Claims, 10 Drawing Sheets

CASTER ASSEMBLIES HAVING CAM-OPERATED BRAKES

FEDERALLY SPONSORED RESEARCH

This invention was made with Government support under contract number N00019-18-C-1012 awarded by the Department of Defense. The Government has certain rights in this invention.

FIELD OF THE DISCLOSURE

This disclosure relates generally to casters and, more particularly, to caster assemblies having cam-operated brakes.

BACKGROUND

Installing engines on aircraft can be challenging due to a size of the engine and/or a height of engine bays on an aircraft relative to the ground. To facilitate installation, manufacturers employ transport carts or dollies.

BRIEF DESCRIPTION OF THE DRAWINGS

In general, the same reference numbers will be used throughout the drawing(s) and accompanying written description to refer to the same or like parts.

Figure 1:
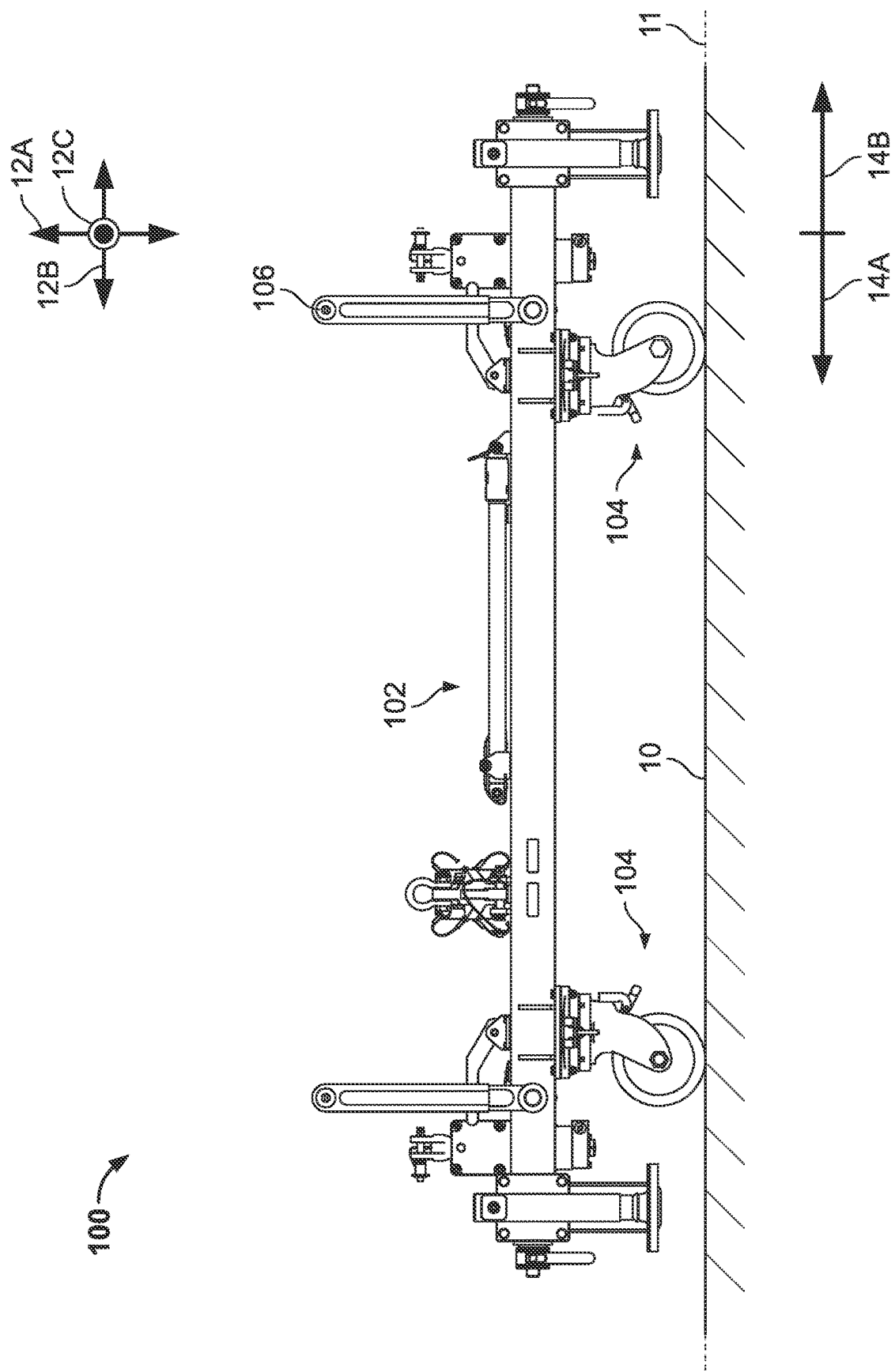
FIG. 1 is a side view of an example transport dolly in accordance with teaching disclosed herein.

As used herein, unless otherwise stated, the term "above" describes the relationship of two parts relative to Earth when an aircraft is resting upon landing gear on the ground. A first part is above a second part, if the second part has at least one part between the Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "substantially," "approximately" and/or "about" modify their subjects/values to recognize the potential presence of variations that occur in real world applications. For example, "substantially," "approximately" and/or "about" may modify dimensions that may not be exact due to manufacturing tolerances and/or other real world imperfections as will be understood by persons of ordinary skill in the art. For example, "substantially," "approximately" and/or "about" may indicate such dimensions may be within a tolerance range of +/−10% unless otherwise specified in the below description.

DETAILED DESCRIPTION

Engine installation systems can include a transport dolly to transport an engine across a tarmac or flight deck to an aircraft. The transport dolly uses brakes to secure the engine installation system in place on flat or sloped ground or surface. For example, when the engine installation system is in position beneath an engine bay of the aircraft, an operator can engage one or more brakes to prevent and/or restrict movement of the dolly and safely raise an adapter cradle to lift the engine (e.g., into place) relative to an engine bay. Furthermore, engine installation systems can be operated on a flight deck of an aircraft carrier, which can rock or tilt due to the waves. Thus, an operator may engage the brakes due to movement of the ground surface (e.g., flight deck).

Example transport dollies disclosed herein are described in connection with example engine installation systems for transporting and/or installing engines onto aircraft. However, in some examples, disclosed transport dollies and disclosed caster assemblies can be implemented on installation systems for weapons (e.g., missiles, artillery, etc.), fuel tanks, structural components (e.g., beams, ribs, stringers, panels, etc.), communication apparatus (e.g., radars, etc.), or the like, and/or other applications that employ a transport dolly.

Some known engine installation systems use dead man brakes to lock or restrict movement of one or more wheels of a transport dolly. Dead man brakes typically include a handle (e.g., a bail handle, etc.) that operates a cable or hydraulics to engage or release brakes of a wheel. For example, the handle is coupled to a brake via a brake line (e.g., a hydraulic brake line, a cable, etc.) such that when the handle is engaged (e.g., held), the brakes are disengaged, and when the handle is disengaged (e.g., released), the brakes are engaged. However, dead man brakes are associated with increased weight, which increases the push force required to transport goods (e.g., an engine) on the transport dolly. Furthermore, dead man brakes are prone to increased repairs or maintenance and are typically impractical and/or unnecessary when the transport dolly is utilized on flat, steady ground (e.g., in a hangar). In some examples, dead man brakes employ an additional wheel that supports the brake.

Some known engine installation systems use caster brakes to lock or restrict movement of one or more wheels of a transport dolly. Caster brakes typically include a foot-activated pedal located adjacent a caster frame. When the pedal is pressed/activated, a brake pad engages a wheel of the engine installation system and restricts rotation thereof. Such caster brakes are simpler than dead man brakes and are typically lighter, less complex, and more reliable. However, foot-activated caster brakes can be challenging to activate, especially when the transport dolly is in motion and supporting a relatively heavy load (e.g., an aircraft engine). For example, a position of a pedal on the caster brakes can be difficult for the operator to reach based on a size of the pedal, a location of the pedal, etc. Additionally, pedals of caster brakes protrude from the caster frame in one or more directions, such as sideways and away from a dolly frame. Moreover, when the size of the pedal is increased to improve accessibility of the caster brake, the pedals can also be prone to unintentional or inadvertent activation and/or release by a nearby operator, object, etc. Furthermore, when the caster brake uses a locking mechanism (e.g., latch, spring, etc.) to keep the brake engaged, the components of the mechanism can wear, weaken, or otherwise reduce the force that the brake applies to the wheel.

Examples disclosed herein employ hand-operated caster brake assemblies for a transport dolly. In some instances, caster brake systems disclosed herein can be implemented with engine transportation systems. Example caster assemblies disclosed herein employ a lever arm mounted on a dolly frame of the transportation dolly. Example lever arms disclosed herein employ a cam at one end to remotely operate a brake arm of a caster wheel (e.g., to move a brake arm between an engaged position and a released position). The cam of the lever arm interfaces with a pin, and the pin interfaces with (e.g., operatively couples) the cam and a brake arm of a brake assembly. As such, the cam, the pin, and the brake arm define a mechanical linkage. The brake arm is rotatably coupled to a caster frame, and a spring influences or biases the brake arm toward a released position. Thus, when the lever arm is moved from a first position (e.g., a lowered position relative to the dolly frame) to a second position different than the first position (e.g., a raised position relative to the dolly frame), the cam allows the brake arm to release or disengage the wheel (e.g., a released position), respectively. Alternatively, when the lever arm is moved to the first position from the second position, the cam applies a compressive force on the pin, which causes the brake arm to engage the wheel (e.g., an engaged position).

Example caster assemblies disclosed herein apply greater compressive forces on the brake arm, which improves engagement performance and/or movement restriction of one or more caster wheels than conventional caster brakes (e.g., foot-operated caster brakes). For example, the cam and the pin have certain properties (e.g., shape, length, diameter, material, etc.) to ensure compressive forces cause the brake arm to engage the wheel. Additionally, example cam-operated caster assemblies disclosed herein can be easier to engage than traditional caster brakes. For instance, example lever arms are coupled to the dolly frame, which the operator can access and activate by hand (e.g., as opposed to a foot). Furthermore, the length of example lever arms is increased relative to pedals of conventional caster brakes, which corresponds to greater torque and greater compressive force on the brake arm when the operator applies a given force on the lever arm. Moreover, example caster assemblies disclosed herein include fewer components that are prone to wear and/or failure. For example, the lever arm, the cam, and the pin are the primary sources of the compressive force that causes the brake arm to engage the wheel, and such components have increased durability, reduced mechanical complexity, improved reliability, etc.

FIG. 1 is a side view of an example transport dolly 100 in accordance with teachings of this disclosure. The transport dolly 100 of the illustrated example includes a dolly frame 102 supported by a caster brake assembly system 104. The caster brake assembly system 104 is to facilitate movement of the transport dolly 100 and/or to selectively restrict or prevent movement of the transport dolly 100 relative to a ground surface 10. As such, the transport dolly 100 can be rotated or turned (e.g., clockwise and/or counterclockwise) within a turning radius about a first axis 12A, transported along a straight path (e.g., in a forward direction 14A or a rearward direction 14B along a second axis 12B or a third axis 12C) and/or transported along a skewed path (e.g., in a path along a combination of the second axis 12B and the third axis 12C). To facilitate movement of the transport dolly 100, the transport dolly 100 includes one or more transport handles 106 rotatably and/or operatively coupled to the dolly frame 102. The transport handles 106 are configured to be gripped by a user to facilitate transporting the transport dolly 100 across the ground surface 10, such as by pushing or pulling on one or more of the transport handles 106.

Figure 2:
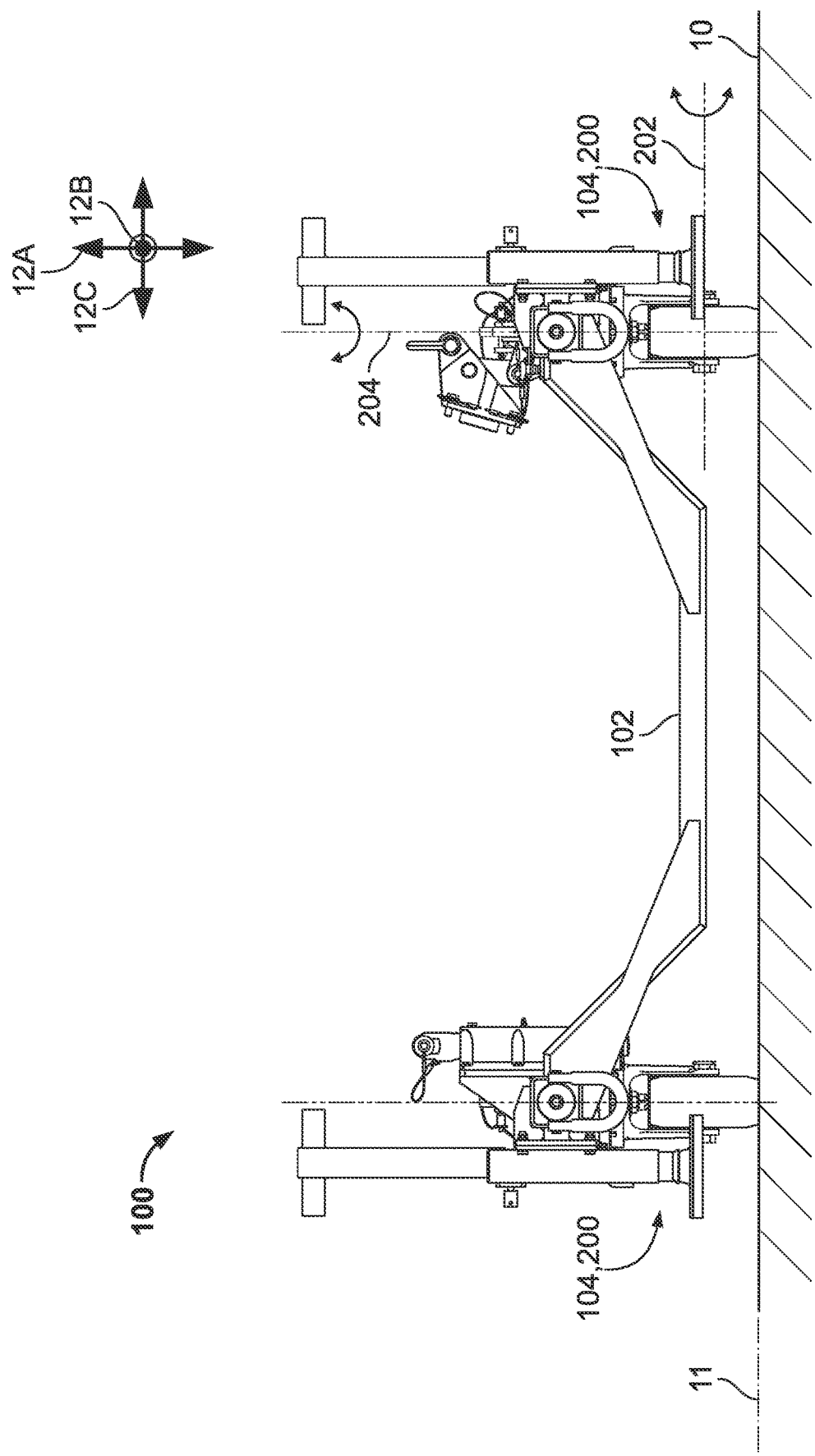
FIG. 2 is a front view of the example transport dolly of FIG. 1.

FIG. 2 is a front view of the example transport dolly 100 of FIG. 1. The caster brake assembly system 104 of the illustrated example includes a plurality of caster assemblies 200. Each of the caster assemblies 200 of the illustrated example defines a rotational axis 202 and a swivel axis 204. The rotational axis 202 is substantially horizontal or parallel to the ground surface 10 and the swivel axis 204 is substantially vertical or perpendicular relative to the ground surface 10. The swivel axis 204 of the illustrated example is substantially parallel relative to the first axis 12A. Thus, the rotational axis 202 of the illustrated example is substantially perpendicular relative to the swivel axis 204.

As used herein, the term "vertical," is used to describe a direction, a dimension, an orientation, etc. and is intended to refer to an axis that is parallel to a direction of a force of gravity and/or that is perpendicular to the ground surface 10. However, such descriptions are not limited to examples in which ground surface 10 is perfectly level and/or perpendicular to the direction of the force of gravity. For example, the first axis 12A (e.g., a vertical axis) may be described as extending perpendicular to the ground surface 10 and/or to a portion thereof even when ground surface 10 is uneven, angled, tilted, and/or otherwise does not extend entirely and/or perfectly perpendicular to the direction of the force of gravity. Additionally, as used herein, a component, path, etc. may be described as moving and/or extending vertically, and/or in a vertical direction, when the component, path, etc. moves and/or extends along a direction at least substantially parallel to the first axis 12A even in examples in which such motion and/or extent is not perfectly parallel to the first axis 12A.

As used herein, the term "horizontal," as used to describe a direction, a dimension, an orientation, etc. and is intended to refer to an axis that is orthogonal to a direction of a force of gravity and/or that is parallel to the ground surface 10.

However, such descriptions are not limited to examples in which ground surface 10 is perfectly level and/or perpendicular to the direction of the force of gravity. For example, the second axis 12B and/or the third axis 12C (e.g., horizontal axes) may be described as extending parallel to the ground surface 10 and/or to a portion thereof even when ground surface 10 is uneven, tilted, and/or otherwise does not extend entirely and/or perfectly perpendicular to the direction of the force of gravity. Additionally, as used herein, a component, path, etc. may be described as moving and/or extending horizontally, and/or in the forward direction 14A or the rearward direction 14B when the component, path, etc. moves and/or extends along a direction at least substantially parallel to the ground surface 10 and/or a horizontal reference line 11, even in examples in which such motion and/or extent is not perfectly parallel to the horizontal reference line 11.

Figure 3:
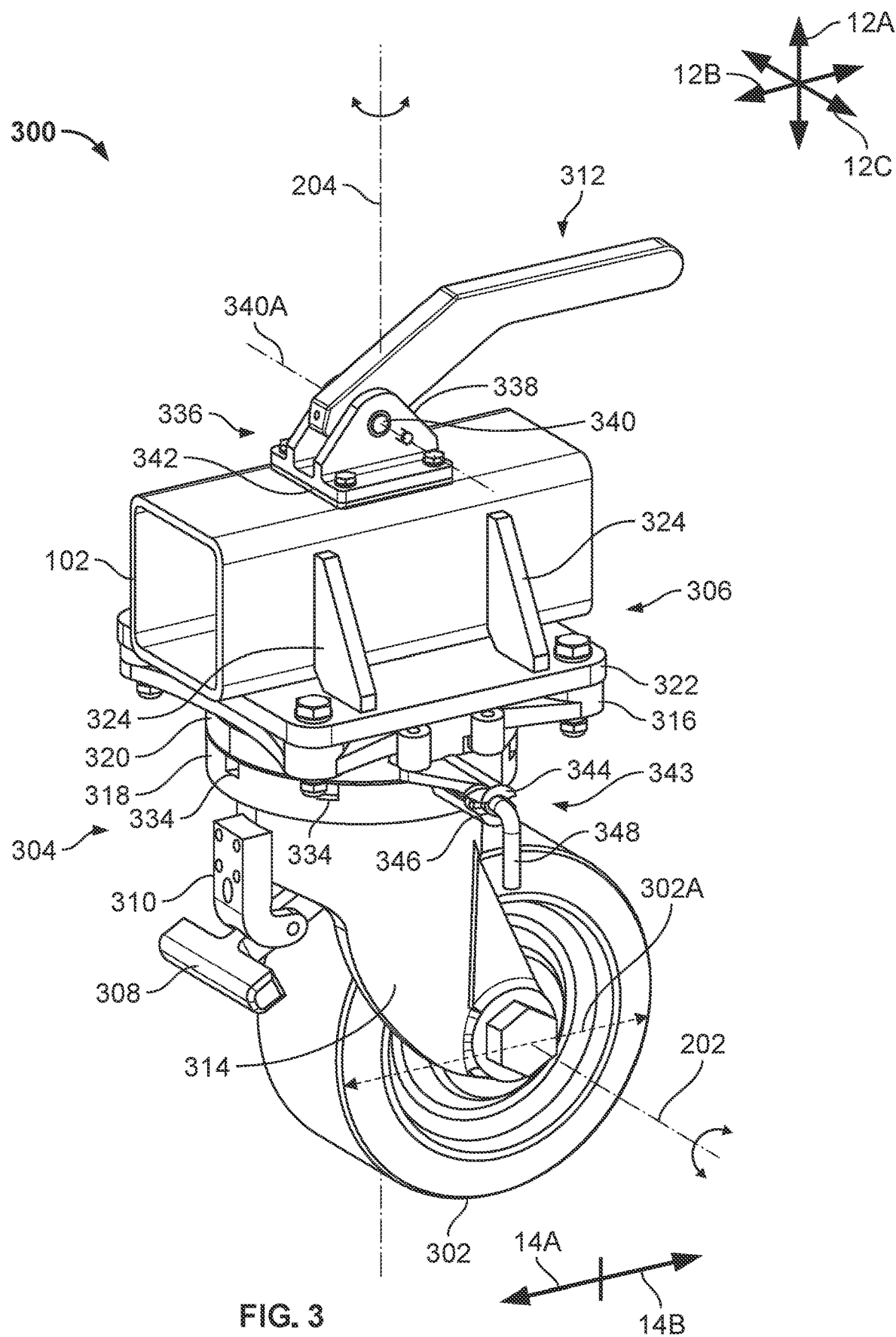
FIG. 3 is a perspective view of an example caster assembly in accordance with teachings disclosed herein to implement the transport dolly of FIG. 1.

FIG. 3 is a perspective view of a caster assembly 300 disclosed herein that can implement the caster brake assembly system 104 and/or one or more of the caster assemblies 200 of FIGS. 1 and 2. The caster assembly 300 of the illustrated example includes a wheel 302, a caster frame assembly 304, a dolly frame assembly 306, a brake arm 308, a brake arm bracket 310, and a lever arm 312.

The caster frame assembly 304 of the illustrated example rotatably supports the wheel 302 about the rotational axis 202. To enable rotation of the wheel 302 about the rotational axis 202, the caster frame assembly 304 includes a caster frame 314 (e.g., a yoke, a leg, a prong, etc.). Specifically, the caster frame 314 includes an aperture aligned (e.g., coaxially aligned) with the rotational axis 202 and receives a fastener, a bushing, a bearing, etc., of the wheel 302 (e.g., to enable rotation of the wheel 302 relative to the caster frame 314 about the rotational axis 202). In some examples, the wheel 302 (e.g., a wheel center) is supported by a radial bearing to reduce a force required to rotate the wheel 302 about the rotation axis 202. The wheel 302 of the illustrated example can be made of a hard material, such as rubber (e.g., air pneumatic, solid pneumatic, etc.), plastic (e.g., phenolic, etc.), polymer (e.g., polyurethane, etc.), metal (e.g., iron, etc.), etc. In such examples, the wheel 302 can have a hardness that corresponds with a 70D rating on a durometer shore hardness scale to facilitate ease of movement of the transport dolly 100 (FIG. 1) while reducing wear of the wheel 302. In some examples, the wheel 302 has a diameter 302A of 8.5 inches. Alternatively, the diameter 302A may be greater than or less than 8.5 inches.

Additionally, the caster frame assembly 304 is pivotally coupled to the dolly frame assembly 306 to enable the wheel 302 to swivel relative to the dolly frame 102 about the swivel axis 204. To enable the wheel 302 to swivel about the swivel axis 204, the caster frame 314 of the illustrated example is rotatably coupled to a caster mounting plate 316 of the caster frame assembly 304. More specifically, the caster frame 314 includes a flange 318 that interfaces with a platform 320 of the caster mounting plate 316. The platform 320 can be mounted on the flange 318 with an interposing thrust bearing to facilitate rotation of the caster frame 314.

The caster frame assembly 304 of the illustrated example includes the brake arm 308 and the brake arm bracket 310. In particular, the brake arm bracket 310 is fixed to the caster frame 314. Additionally, the brake arm 308 of the illustrated example is pivotally coupled to the brake arm bracket 310. As such, the brake arm 308 pivots relative to the caster frame 314 via the brake arm bracket 310.

The dolly frame assembly 306 couples the caster frame assembly 304 and the frame 102. To couple the caster frame assembly 304 and the frame 102, the dolly frame assembly 306 of the illustrated example includes a dolly mounting plate 322 and a plurality of struts 324. The mounting plate 322 of the illustrated example is coupled (e.g., fixed) to the frame 102 (e.g., via welding, fasteners, etc.). Additionally, the struts 324 are fastened (e.g., welded) to the dolly mounting plate 322 and the dolly frame 102. The struts 324 inhibit bending or buckling of the caster assembly 300. In the illustrated example, the dolly frame assembly 306 includes four struts 324. In some examples, the dolly frame assembly 306 can include any number of struts 324, such as, six, eight, etc.

To operate the brake arm 308, the caster assembly 300 of the illustrated example includes the lever arm 312. The lever arm 312 is coupled to the dolly frame 102 via a clevis joint 336. The clevis joint 336 includes a bracket 338, a hinge pin 340, and a shim 342. The bracket 338 is coupled to the dolly frame 102 via fasteners (e.g., bolts). The shim 342 is positioned between the bracket 338 and the dolly frame 102. In some examples, the shim 342 is made of a different material (e.g., a polymer, beryllium copper, etc.) than the bracket 338 and/or the dolly frame 102 to prevent corrosion between materials of the shim 342, the bracket 338 and/or the dolly frame 102. In some examples, the bracket 338 and/or the dolly frame 102 may be stainless steel and/or another suitable material (e.g., iron, steel alloy, etc.). In some examples, the caster assembly 300 does not include the shim 342.

In the illustrated example, the clevis joint 336 allows the lever arm 312 to rotate about a hinge axis 340A defined by the hinge pin 340. In some examples, the swivel axis 204 is positioned orthogonal to the hinge axis 340A. The hinge axis 340A may or may not intersect the swivel axis 204. In some examples, the hinge axis 340A is aligned (e.g., is substantially parallel) with the third axis 12C. In some examples, the swivel axis 204 is aligned (e.g., substantially parallel) with the first axis 12A. In the illustrated example, rotation of the lever arm 312 about the hinge axis 340A is decoupled from rotation of the caster frame assembly 304 about the swivel axis 204. In other words, the wheel 302 is able to swivel relative to frame 102 about the swivel axis 204 without the lever arm 312 also swiveling relative to the frame 102 about the swivel axis 204. In other words, the lever arm 312 can only pivot relative to the frame 102 about the hinge axis 340A and does not swivel relative to the frame 102 relative to the swivel axis 204.

As shown in FIG. 3, the caster assembly 300 includes a lock 343 (e.g., a swivel lock) to fix the orientation of the caster frame assembly 304 (and the wheel 302) relative to the dolly frame assembly 306 and/or the dolly frame 102. The lock 343 includes an upper sleeve section 344, a lower sleeve section 346, and a locking pin 348. In the illustrated example, the upper sleeve section 344 protrudes from the platform 320 of the caster mounting plate 316, and the lower sleeve section 346 protrudes from the flange 318 of the caster frame 314. The upper sleeve section 344 aligns with the lower sleeve section 346 to receive the locking pin 348 therebetween. When the locking pin 348 is inserted with the lock 343, the locking pin 348 can be rotated by a certain degree (e.g., ninety degrees) to fix the orientation of the caster frame 314 relative to the caster mounting plate 316. As shown, the flange 318 includes a plurality of slots 334 (or holes). The slots 334 of the illustrated example are circumferentially spaced relative to swivel axis 204. In the illustrated example, the slots 334 are radially spaced about the swivel axis 204 at approximately 45-degree increments. However, in other examples, the slots 334 can be radially spaced relative to the swivel axis 204 about approximately 15-degree increments, 30-degree increments, 60-degree increments, or any other desired increment(s). The lower sleeve section 346 is removable from the flange 318 and insertable into another one of the slots 334. As such, the caster frame assembly 304 and the wheel 302 can be fixed in a certain orientation (e.g., 45 degrees, 90 degrees, etc.) other than the orientation (e.g., zero degrees) depicted in FIG. 3.

Figure 4:
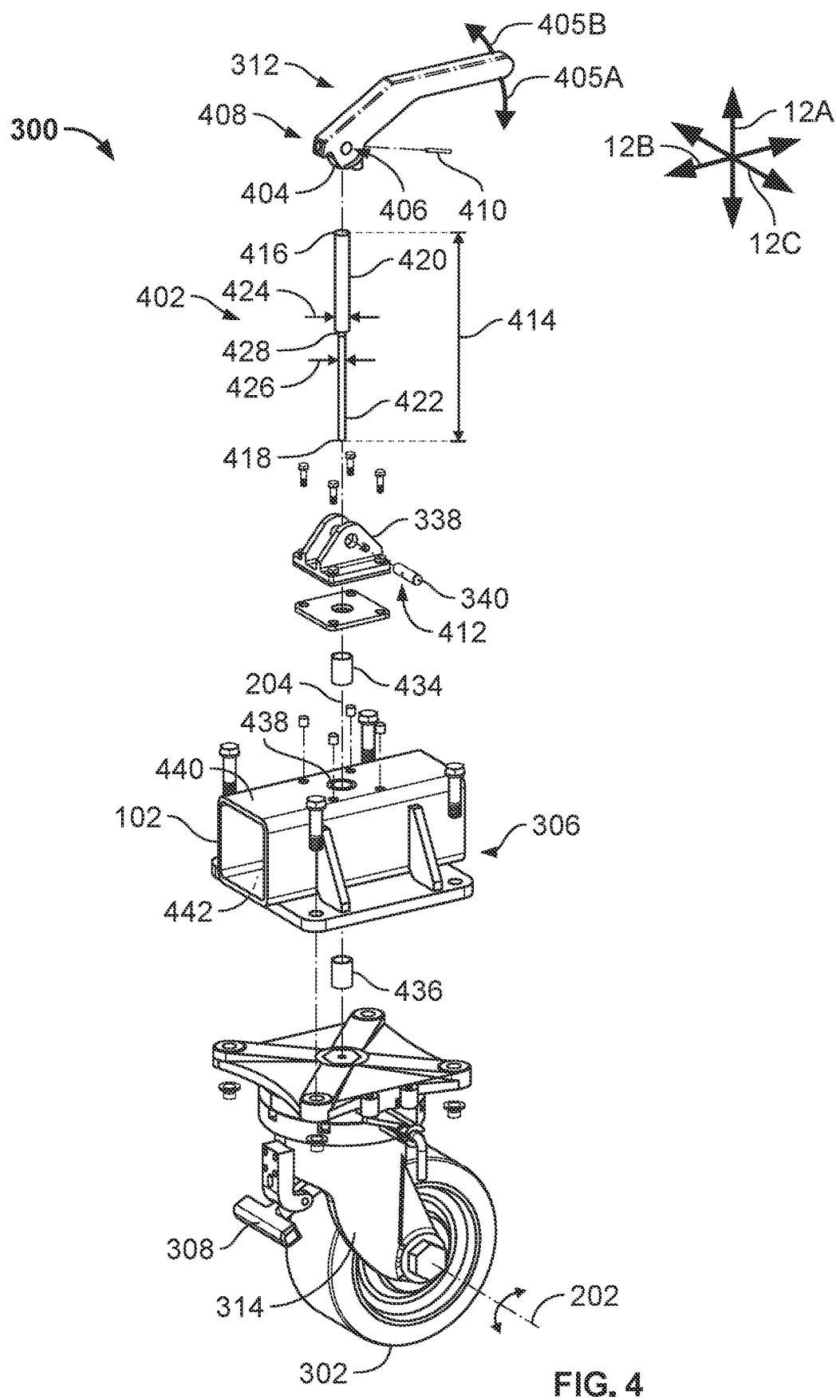
FIG. 4 is a perspective, exploded view of the example caster assembly of FIG. 3.

FIG. 4 is an exploded perspective view of the caster assembly 300 of FIG. 3. To actuate or move the brake arm 308 via the lever arm 312, the caster assembly 300 of the illustrated example includes a pin 402. Specifically, the lever arm 312 includes a cam 404 (or a cam surface profile) to actuate the pin 402. Specifically, rotation of the lever arm 312 relative to the dolly frame 102 in a first rotational direction 405A is to cause the cam 404 to actuate or engage the pin 402 to enable the brake arm 308 to move to an engaged position to restrict or prevent rotation of the wheel 302 (e.g., about the rotation axis 202). Rotation of the lever arm 312 relative to the dolly frame 102 in a second rotational direction 405B opposite the first rotational direction 405A is to cause the cam 404 to release or disengage the pin 402 to enable the brake arm 308 to move to a released position to enable rotation of the wheel 302. Moreover, the cam 404 includes an eccentric shape that maintains a first (e.g., lowered) position of the lever arm 312 until an operator applies a force to the lever arm 312 in the second rotational direction 405B.

The lever arm 312 of the illustrated example includes a first hole 406 (e.g., a first through hole) to receive the hinge pin 340 and a second hole 408 (e.g., a second through hole) to receive a spring pin 410. In the illustrated example, the first hole 406 intersects with the second hole 408 (e.g., a longitudinal axis of the first hole 406 is perpendicular relative to a longitudinal axis of the second hole 408). Furthermore, as shown, the hinge pin 340 includes a third hole 412 (or third through hole) that aligns with the second hole 408 (e.g., when the lever arm 312 and the hinge pin 340 are coupled to the bracket 338). In other words, the spring pin 410 can be disposed within the second hole 408 and the third hole 412 when the hinge pin 340 is disposed within the first hole 406. As such, the spring pin 410 intersects the hinge pin 340 to hold the hinge pin 340 within the lever arm 312 and the bracket 338. In some examples, the spring pin 410 is a coiled spring pin. In other examples, the spring pin 410 is a slotted spring pin or any other suitable biasing element or spring.

In the illustrated example of FIG. 4, the pin 402 has an overall length 414 between a first end 416 and a second end 418 opposite the first end 416. In some examples, the first end 416 of the pin 402 extends at least partially through the dolly frame 102, and the second end 418 extends at least partially through the caster frame 314. Furthermore, the pin 402 includes a first portion 420 and a second portion 422. The first portion 420 has a first diameter 424, and the second portion 422 has a second diameter 426 different than (e.g., less than) the first diameter 424. For example, the first diameter 424 can be 0.5 inches (in), 0.625 in, 0.75 in, etc. In another example, the second diameter 426 can be 0.25 in, 0.272 in, 0.30 in, etc. The pin 402 of the illustrated example includes a transitional portion 428 positioned between the first end 416 and the second end 418. The transitional portion 428 defines a tapered surface between the first diameter 424 and the second diameter 426. In some examples, the transitional portion 428 defines an abrupt change or stepped surface between the first diameter 424 and the second diameter 426. The first portion 420 of the pin 402 is defined between the first end 416 of the pin 402 and the transitional portion 428 of the pin 402. The second portion 422 of the pin 402 is defined between the second end 418 of the pin 402 and the transitional portion 428.

In the illustrated example of FIG. 4, the caster assembly 300 includes a first bushing 434 and a second bushing 436 disposed within a sleeve 438. The sleeve 438 extends through the dolly frame 102 and is flush or aligned with a first surface 440 (e.g., an upper surface) of the dolly frame 102. In some examples, the sleeve 438 is flush or aligned with the first surface 440 and a second (or lower) surface 442 of the dolly frame 102. The first portion 420 of the pin 402 is disposed within the dolly frame 102 and is supported by at least one of the first bushing 434 and/or the second bushing 436. More specifically, the first bushing 434 and the second bushing 436 are coupled to (e.g., fixed within) the sleeve 438 via an interference fit. The first portion 420 of the pin 402 is slidably disposed within the first bushing 434 and the second bushing 436. As such, inner diameters of the first bushing 434 and the second bushing 436 correspond to the first diameter 424 of the first portion 420 of the pin 402. Thus, the first bushing 434 and the second bushing 436 align (e.g., coaxially align) with the pin 402 relative to the swivel axis 204 (e.g., vertically align). As a result, the pin 402 (or a central axis of the pin 402) is substantially parallel relative to the first axis 12A. In some examples, the first bushing 434 and the second bushing 436 include (e.g., are composed of) aluminum bronze (e.g., CuAl5, CuAlFe3, etc.) to provide a smooth (e.g., a low friction) contact and/or non-corrosive contact between the pin 402 and the bushings 434, 436.

In some examples, the caster assembly 300 includes means for rotatably supporting the wheel 302 of the caster assembly 300. For example, the means for rotatably supporting the wheel 302 can be implemented by the dolly frame assembly 306 and/or the caster frame 314. In some examples, the caster assembly 300 includes means for locking rotation of the wheel 302 operatively coupled to the means for rotatably supporting the wheel 302. For example, the means for locking can be implemented by the brake arm 308, the pin 402 and/or the lever arm 312. In some examples, the caster assembly 300 includes means for moving (e.g., activating or deactivating) the means for locking rotation between a brake position to restrict movement of the wheel 302 and a release position to enable rotation of the wheel 302. For example, the means for moving can be implemented by the pin 402. In some examples, the caster assembly 300 includes means for operating the means for locking rotation. The means for operating is rotatably coupled relative to the means for rotatably supporting the wheel 302. Furthermore, rotation of the means for operating between a first position and a second position is to cause the means for locking rotation to move between the brake position and the release position via the means for moving. For example, the means for operating can be implemented by the lever arm 312.

Figure 5:
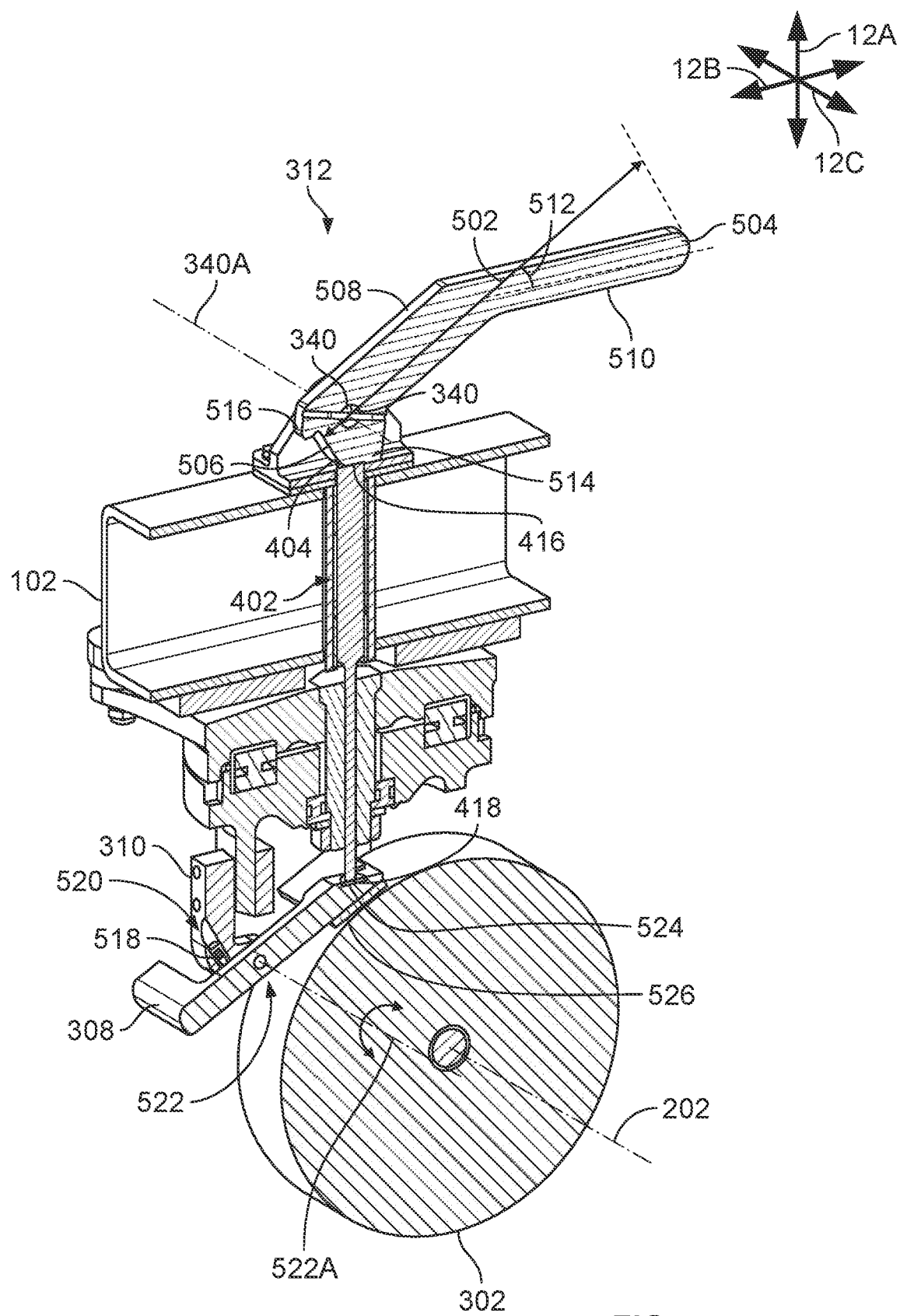
FIG. 5 is a cross-sectional, perspective view of the example caster assembly of FIG. 3.

FIG. 5 is a perspective, cross-sectional view of the caster assembly 300 of FIG. 3. In the illustrated example of FIG. 5, the lever arm 312 has a first dimension 502 (e.g., a length) between a third end 504 and a fourth end 506 opposite the third end 504. As shown, the fourth end 506 of the lever arm 312 includes the cam 404 to engage the pin 402. The lever arm 312 includes a base 508 (or base portion) defining the fourth end 506 and a handle 510 (or handle portion) defining the third end 504. The cam 404 has an irregular or eccentric shape (e.g., surface profile) to engage (e.g., contacts, interfaces with, etc.) the first end 416 of the pin 402. The shape of the cam 404 corresponds to an eccentric arc with a varying distance between the first end 416 of the pin 402 and the hinge axis 340A. As such, when the lever arm 312 is lowered, the cam 404 rotates, and the distance between the first end 416 and the hinge axis 340A increases.

Figure 7:
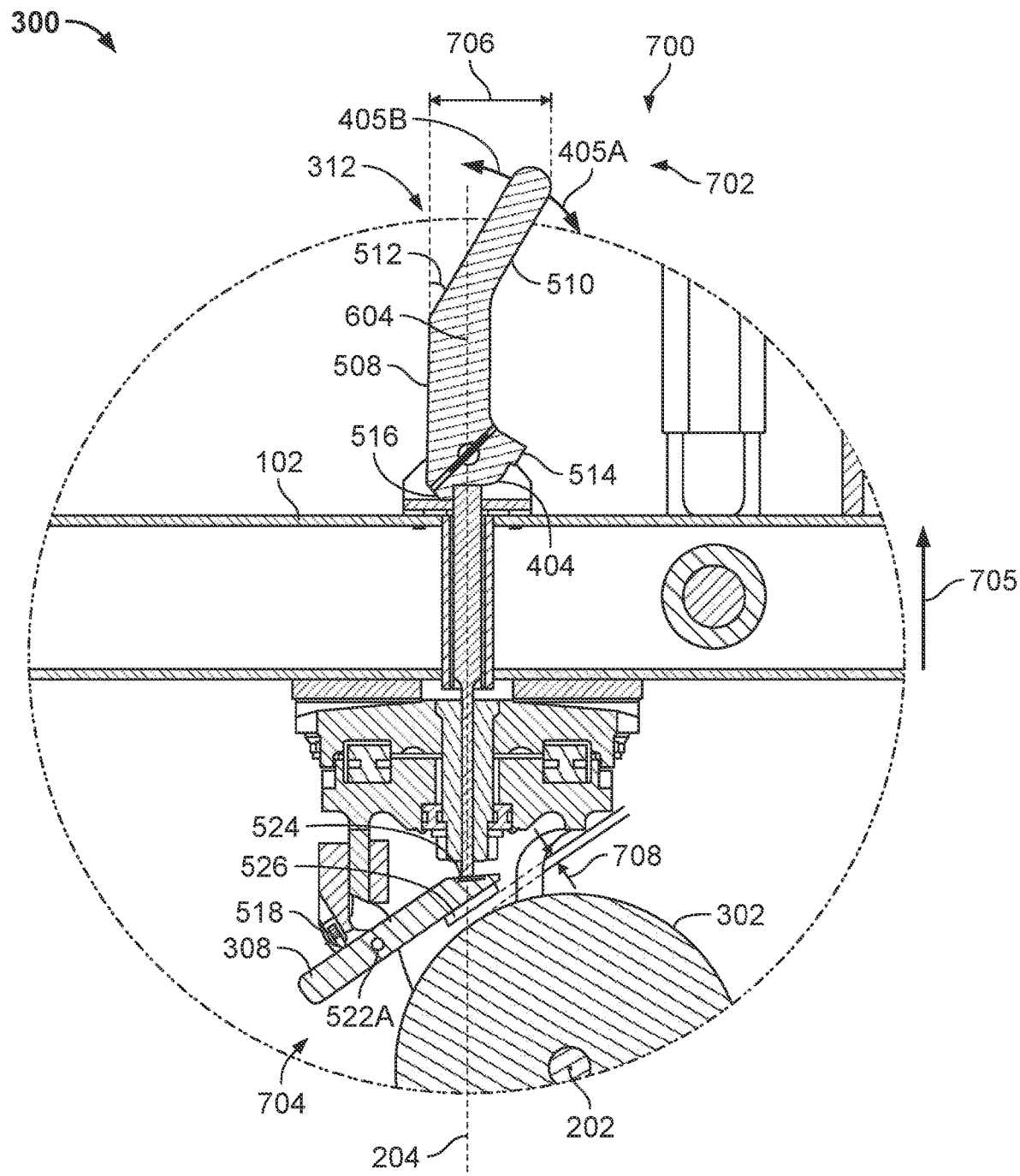
FIG. 7 is a partial, cross-sectional side view of the example caster assembly of FIG. 4 in an example released position.

The handle 510 is oriented at a first angle 512 relative to the base 508. In some examples, the first angle 512 is between 25 degrees and 35 degrees, such as 30 degrees, 29 degrees, 31 degrees, etc. Furthermore, the hinge pin 340 extends through the bracket 338 and the fourth end 506 of the lever arm 312 to allow the lever arm 312 and the cam 404 to pivot (e.g., rotate) relative to the dolly frame 102. Additionally, the lever arm 312 includes a first lip 514 (e.g., a first stop) and a second lip 516 (e.g., a second stop) at the fourth end 506 and on opposing sides of the cam 404. Thus, the cam 404 extends circumferentially along the fourth end 506 between the first lip 514 and the second lip 516. As such, when the lever arm 312 is in a first position (e.g., as shown in FIG. 5), the first lip 514 abuts the first end 416 of the pin 402. Similarly, when the lever arm 312 is in a second position (e.g., as shown in FIG. 7), the second lip 516 abuts the first end 416 of the pin 402. Thus, when an operator or user manually rotates the lever arm 312 to operate (e.g., engage or disengage) the caster assembly 300, the first lip 514 and the second lip 516 prevent the lever arm 312 from rotating beyond an arcuate path defined between the first lip 514 and the second lip 516.

Furthermore, the caster assembly 300 includes a spring 518 to influence or bias the brake arm 308. Specifically, the caster assembly 300 and/or the spring 518 are structured to enable the spring 518 to bias the brake arm 308 toward a released position when the lever arm 312 is rotated to cause the cam 404 to release the pin 402 so that the pin 402 does not apply a force to the brake arm 308. That is, when the lever arm 312 is in a second (e.g., raised) position, the spring 518 causes the brake arm 308 to rotate and disengage the wheel 302. The spring 518 is disposed within a fourth hole 520 (e.g., an angled, slanted or a diagonal bore, a through hole, an opening, etc.) of the brake arm bracket 310. In some examples, the spring 518 is coupled to and/or disposed within a sleeve and/or a counterbore of the fourth hole 520. In some examples, the spring 518 does not bottom out when the lever arm 312 is in a first position (e.g., a brake position).

In the illustrated example, the brake arm 308 includes a fifth through hole 522 (e.g., a straight, bore or opening) to couple the brake arm 308 and the brake arm bracket 310. For example, the brake arm 308 includes a fastener (e.g., a bolt, a pin, a spring pin, etc.) disposed in the fifth through hole 522 to couple the brake arm 308 to the brake arm bracket 310 and to enable rotation of the brake arm 308 about the pivot axis 522A. As such, the fifth through hole 522 defines a pivot axis 522A about which the brake arm 308 rotates. Thus, the brake arm 308 rotates about the pivot axis 522A to move between the engaged and released positions.

As shown in FIG. 5, the caster assembly 300 includes a buffer pad 524 and a brake pad 526 coupled (e.g., chemically bonded, welded, etc.) to the brake arm 308. In some examples, the lever arm 312 is made of a first material (e.g., stainless steel). The pin 402 is made of a second material (e.g., beryllium copper) different than the first material to ensure the contacting components do not corrode, dent, abrade, and/or otherwise become damaged. For example, the caster assembly 300 can be implemented on an aircraft carrier where salt water or vapor acts as an electrolyte and causes corrosion between two engaging components formed from the same or like materials or metals. Thus, because the pin 402 is composed of the second material, the contacting components (e.g., the lever arm 312 and/or the pin 402) are less susceptible to corrosion. In some examples, the brake arm 308 can be made of stainless steel, beryllium copper, iron, steel, an alloy, and/or any other material(s). The buffer pad 524 of the illustrated example provides a pin/brake arm interface to prevent or reduce damage to the pin 402 and/or the brake arm 308 during operation. In some examples, the buffer pad 524 is made of stainless steel, steel alloy, beryllium copper alloy, and/or any other suitable material(s).

The brake arm 308 supports the brake pad 526 and causes the brake pad 526 to move relative to the wheel 302. The brake pad 526 of the illustrated example can be removed or separated from the brake arm 308 to enable replacement of the brake pad 526 when worn. In other examples, the brake pad 526 and the brake arm 308 are a single, unified part. The brake pad 526 includes one or more ridges that run parallel to the third axis 12C. In some known caster brakes, a corresponding brake arm may include a high friction (e.g., textured, tacky, etc.) surface to contact a wheel. The brake pad 526 of FIG. 5 includes more surface area with multiple contact lines for improved interfacing with the hard material of the wheel 302.

Figure 6:
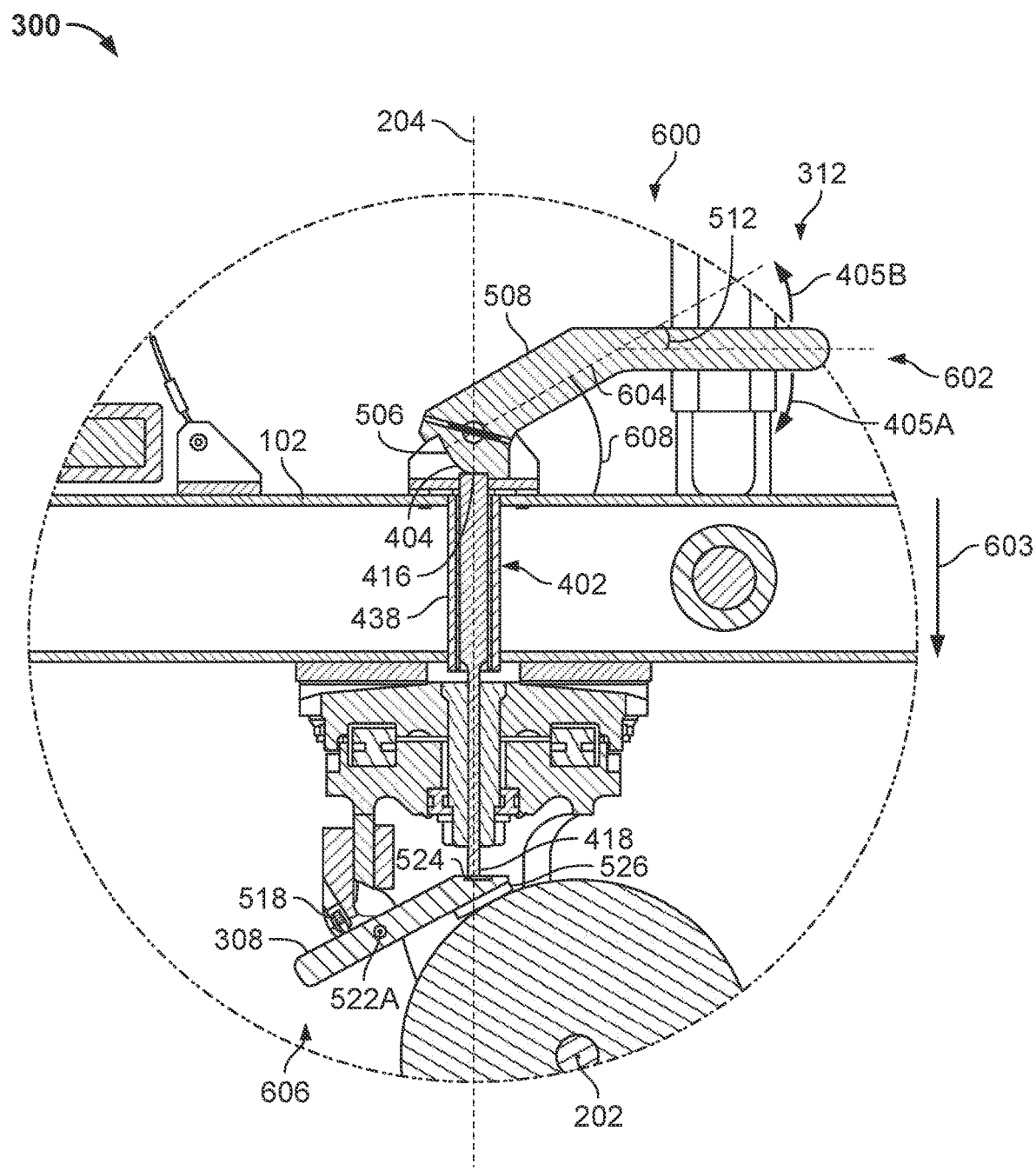
FIG. 6 is a partial, cross-sectional side view of the example caster assembly of FIG. 4 in an example engaged position.

FIG. 6 is a partial, cross-sectional side view of the caster assembly 300 shown in an example braked or engaged position 600. In the illustrated example of FIG. 6, the lever arm 312 is in a first position 602 (e.g., a lowered position). Rotation of the lever arm 312 (in the first rotational direction 405A) to the first position 602 (shown in FIG. 6) causes the fourth end 506 or the cam 404 of the lever arm 312 to actuate the pin 402 in a first linear direction 603 (e.g., in a downward direction in the orientation of FIG. 6) toward the brake arm 308. In the illustrated example, the first linear direction 603 is parallel to the first axis 12A. Specifically, the cam 404 of the lever arm 312 is positioned to engage the first end 416 of the pin 402 to apply a force (e.g., a downward force) to the pin 402 that causes the pin 402 to slide in the sleeve 438 (e.g., in a downward direction in the orientation of FIG. 6). Furthermore, the pin 402 causes the brake arm 308 to pivot about the pivot axis 522A in the first rotational direction 405A to cause the brake pad 526 to engage the wheel 302. In other words, the brake arm 308 pivots about the pivot axis 522A against the biasing force of the spring 518 to move the brake pad 526 of the brake arm 308 against the wheel 302 to restrict rotation of the wheel 302 (e.g., about the rotational axis 202). Thus, the lever arm 312 transmits a force to the brake arm 308 (e.g., against the bias of the spring 518) to cause the caster assembly 300 to move to the engaged position 600.

In the illustrated example of FIG. 6, the base 508 has a longitudinal axis 604 that is oriented non-parallel relative to the swivel axis 204 when the brake arm 308 is in an engaged position 606. More specifically, the longitudinal axis 604 of the base 508 is oriented at a second angle 608 relative to a first surface 610 (e.g., an upper surface) of the dolly frame 102 when the lever arm 312 is in the first position 602. In some examples, the second angle 608 corresponds to (e.g., is equal to) the first angle 512. In other examples, the second angle 608 is different (e.g., greater, or less) than the first angle 512.

FIG. 7 is a partial, cross-sectional side view of the caster assembly 300 shown in an example released position 700. In the illustrated example of FIG. 7, the lever arm 312 is in an example second position 702 (e.g., a raised position). In the released position 700, the brake pad 526 disengages the wheel 302. Specifically, as the lever arm 312 is rotated in the first rotational direction 405A to the second position 702, the cam 404 reduces the force (e.g., the downward force) acting on the pin 402 (e.g., the first end 416 of the pin 402). In some examples, the cam 404 releases the pin 402. In turn, the spring 518 applies a force to the brake arm 308 to move the brake arm 308 into a disengaged position 704. In other words, the spring 518 causes the brake pad 526 of the brake arm 308 to pivot about the pivot axis 522A in the second rotational direction 405B in a direction away from the wheel 302. The brake arm 308, under the bias of the spring 518 and engagement of the buffer pad 524 and the pin 402, causes the pin 402 to move in a second linear direction 705 opposite the first linear direction 603 of FIG. 6 in a direction toward the lever arm 312. In other words, the brake arm 308 applies a force to the second end 418 of the pin 402 to cause the pin 402 to slide within the sleeve 438 toward the lever arm 312 (e.g., an upward direction in the orientation of FIG. 7).

The first angle 512 between the base 508 and the handle 510 results in the lever arm 312 having a second dimension 706 (e.g., an overall width) when in the second position 702. A ratio of the first dimension 502 to the second dimension 706 may be between 2.50 and 3.00 (e.g., 2.57, 2.72, 2.83, etc.). Furthermore, because of the limited rotational path defined by the first lip 514 and the second lip 516 of the lever arm 312, the base 508 of the lever arm 312 is oriented substantially parallel to the swivel axis 204 when the lever arm 312 is in the second position 702. More specifically, the longitudinal axis 604 of the base 508 is substantially parallel relative to the swivel axis 204 when the lever arm 312 is in the second position 702. In the illustrated example of FIG. 7, when the caster assembly 300 and the brake arm 308 are in the released position 700, a clearance 708 is provided between the brake pad 526 and the wheel 302. The clearance 708 can be between 0.25 inches and 0.30 inches, such as 0.27 inches, 0.28 inches, etc. The brake pad 526 disengages the wheel 302 by the clearance 708 to ensure that the brake pad 526 does not engage the wheel 302 during rotation of the wheel 302 when the caster assembly 300 is in the released position 700.

Figure 8:
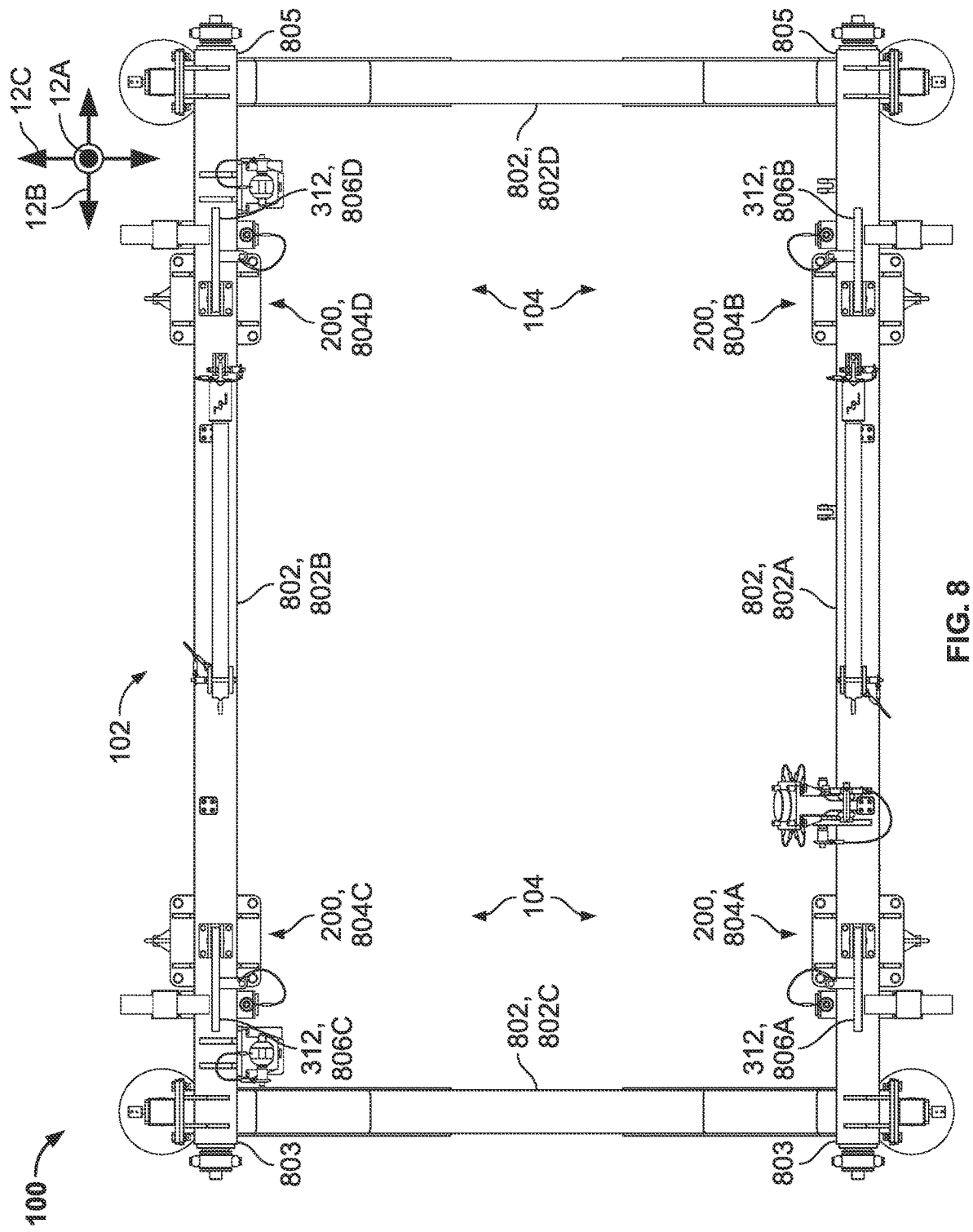
FIG. 8 is a top view of the example transport dolly of FIGS. 1-7.

FIG. 8 is a top view of the transport dolly 100 of FIG. 1. The dolly frame 102 of the illustrated example can include a plurality of beams 802 (e.g., multiple square or hollow sections). The beams 802 of the illustrated example can be made of one or more metals (e.g., steel, alloy, etc.). Specifically, the dolly frame 102 of the illustrated example includes a first side beam 802A, a second side beam 802B, a front beam 802C, and a rear beam 802D. The first side beam 802A is opposite the second side beam 802B, and the front beam 802C is opposite the rear beam 802D. In other words, the front beam 802C is coupled (e.g., welded, fastened, etc.) to respective first ends 803 of the first and second side beams 802A, 802B, and the rear beam 802D is coupled (e.g., welded, fastened, etc.) to respective second ends 805 of the first and second side beams 802A, 802B opposite the respective first ends 803.

Additionally, the caster brake assembly system 104 of the illustrated example includes the plurality of caster assemblies 200. For example, the transport dolly 100 of the illustrated example includes a first caster assembly 804A, a second caster assembly 804B, a third caster assembly 804C, and a fourth caster assembly 804D. For example, the caster assembly 300 of FIGS. 3-7 can implement the first caster assembly 804A, the second caster assembly 804B, the third caster assembly 804C and/or the fourth caster assembly 804D of FIG. 8. The first caster assembly 804A and the second caster assembly 804B are coupled (e.g., attached) to the first side beam 802A, and the third caster assembly 804C and the fourth caster assembly 804D are coupled (e.g., attached) to the second side beam 802B. In the illustrated example of FIG. 8, the first caster assembly 804A and the third caster assembly 804C are proximate to the front beam 802C (e.g., within six inches, one foot, two feet, etc.). Furthermore, the second caster assembly 804B and the fourth caster assembly 804D are proximate the rear beam 802D (e.g., within six inches, one foot, two feet, etc.). In some examples, the transport dolly 100 can include any number of caster assemblies 200. For example, the transport dolly 100 can include six of the caster assemblies 200, eight of the caster assemblies 200, etc. Additionally or alternatively, the transport dolly 100 can include additional components to facilitate transportation of the transport dolly 100, such as wheels, rollers, etc., which may be positioned between and/or adjacent to one or more of the plurality of caster assemblies 200. For example, an additional wheel may be coupled to the dolly frame 102 between the first caster assembly 804A and the third caster assembly 804C to improve turning or pivoting control of the transport dolly 100.

In the illustrated example of FIG. 8, the transport dolly 100 and/or the caster brake assembly system 104 includes a plurality of lever arms 312. For example, the transport dolly 100 of the illustrated example includes a first lever arm 806A, a second lever arm 806B, a third lever arm 806C, and a fourth lever arm 806D. The first lever arm 806A is associated with the first caster assembly 804A, the second lever arm 806B is associated with the second caster assembly 804B, the third lever arm 806C is associate with the third caster assembly 804C and the fourth lever arm 806D is associated with the fourth caster assembly 804D. The plurality of lever arms 312 pivot relative to the dolly frame 102.

Each of the lever arms 312 of the illustrated example is rotatable (or pivotable) between the first position 602 (e.g., lowered position, etc.) and the second position 702 (e.g., raised position, etc.). In some examples, the first position 602 of the lever arms 806A-D is associated with the engaged position 600 of the caster brake assembly system 104. In such examples, the second position 702 of the lever arms 806A-D is associated with the released position 700 of the caster assembly 200. As shown in FIG. 8, the lever arms 806A-D are in the first position 602. In some examples, the first lever arm 806A and the third lever arm 806C pivot toward the front beam 802C when moved (e.g., manually actuated) from the second position 702 to the first position 602. In some examples, the second lever arm 806B and the fourth lever arm 806D pivot toward the rear beam 802D when moved from the second position 702 to the first position 602. Additionally or alternatively, each of the lever arms 806A-D may pivot toward the front beam 802C or the rear beam 802D when moved from the second position 702 to the first position 602 (e.g., and away from the front beam 802C or the rear beam 802D when moved from the first position 602 to the second position 702).

In some examples, the transport dolly 100 can include a first linkage (e.g., a bar, a rod, a coupling, etc.) the couple the first lever arm 806A and the second lever arm 806B and/or a second linkage (e.g., a bar, a rod, a coupling, etc.) to couple the third lever arm 806C and the fourth lever arm 806D. The first linkage is to cause rotation of the first lever arm 806A and the second lever arm 806B substantially simultaneously (e.g., within +/−one second). Furthermore, in some examples, the second linkage is to cause rotation of the third lever arm 806C and the fourth lever arm 806D substantially simultaneously (e.g., within +/−one second). For example, the first linkage can be coupled to the first lever arm 806A and the second lever arm 806B to pivotably interlock the first and second lever arms 806A, 806B. In another example, the second linkage can be coupled to the third lever arm 806C and the fourth lever arm 806D to pivotably interlock the third and fourth lever arms 806C, 806D. Thus, in some examples, movement (e.g., manual pivoting) of the first lever arm 806A or the second lever arm 806B causes movement of the other one of the second lever arm 806B or the first lever arm 806A via the first linkage. Furthermore, in some examples, movement of the third lever arm 806C or the fourth lever arm 806D causes movement of the other one of the fourth lever arm 806D or the third lever arm 806C via the second linkage.

In some examples, the first linkage can include a first handle affixed thereto to enable an operator to move the first and second lever arms 806A, 806B based on a force applied to the first handle. Furthermore, in such examples, the second linkage can include a second handle similar to the first handle of the first linkage. In other examples, the transport dolly 100 includes a brake line system having brake lines coupled to the plurality of caster assemblies 200. Thus, movement of one of the lever arms 312 (e.g., the first lever arm 806A) can cause the plurality of caster assemblies 200 to move into the engaged position via hydraulic pressure in the brake lines.

Figure 9:
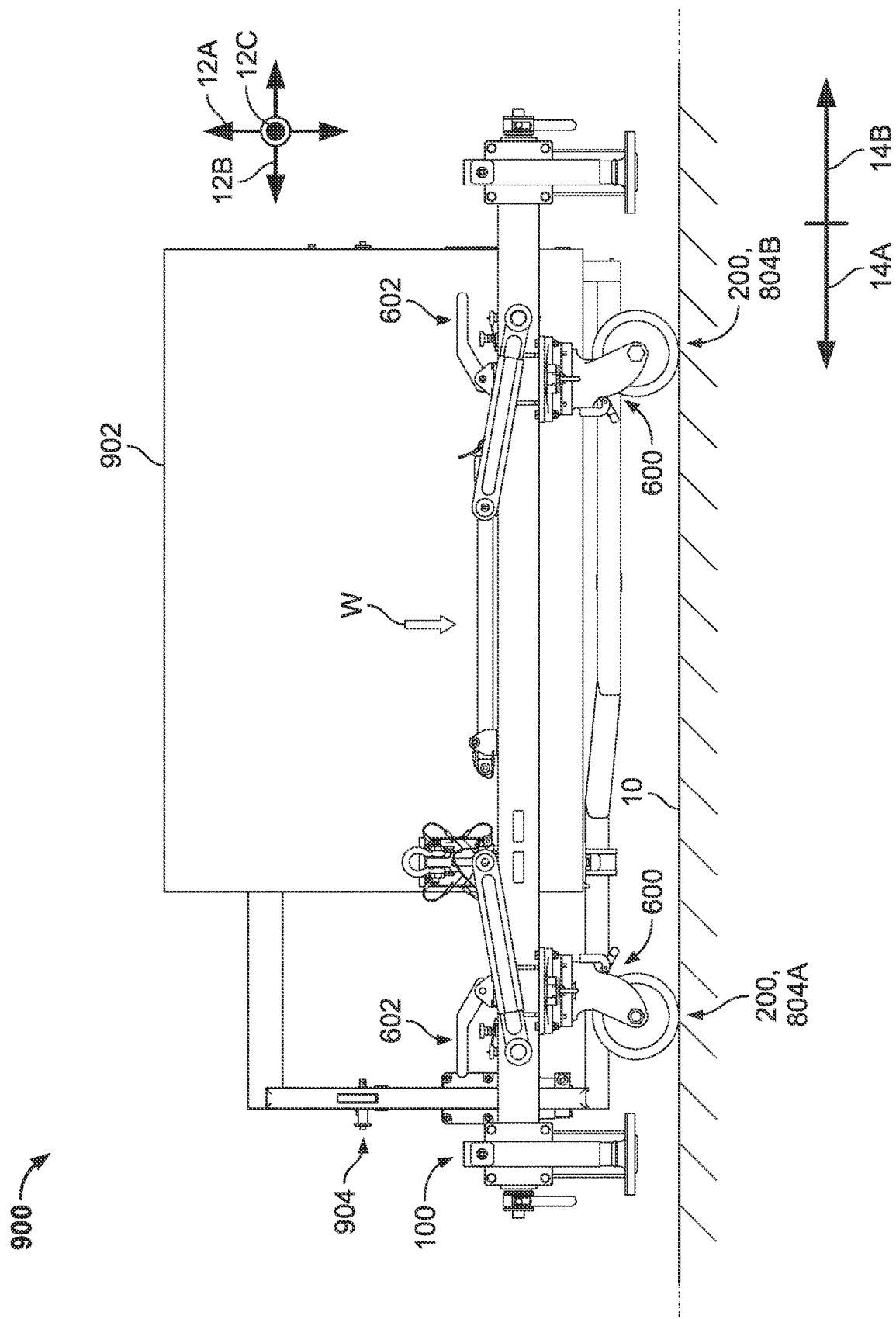
FIG. 9 is a side view of an example engine transportation system disclosed herein shown on a relatively flat surface.

FIG. 9 is a side view of an example engine installation system 900 in accordance with teachings disclosed herein. Specifically, the engine installation system 900 includes the transport dolly 100 of FIGS. 1-8. As illustrated in FIG. 9, the ground surface 10 is level (e.g., flat). The engine installation system 900 can be used to transport an engine 902 across the ground surface 10 and/or to position the engine 902 relative to an engine bay of an aircraft. The engine 902 can be installed on the aircraft in a hangar, on the tarmac, on a flight deck of an aircraft carrier, etc. The engine installation system 900 includes an adapter cradle 904 configured to be selectively and operatively coupled to the engine 902 to support a load W of the engine 902. In some examples, the load W of the engine 902 corresponds to a weight of at least one 2000 pounds, 2200 pounds, 2500 pounds, etc.

The engine installation system 900 of the illustrated example includes the transport dolly 100 to receive or support the adapter cradle 904 and/or the engine 902. The transport dolly 100 enables movement of the engine installation system 900 in the forward direction 14A and/or the rearward direction 14B along the second axis 12B (e.g., a first horizontal axis), the third axis 12C (e.g., a second horizontal axis orthogonal to the first horizontal axis and/or the vertical axis) and/or along a skewed path between the second axis 12B and the third axis 12C.

Figure 10:
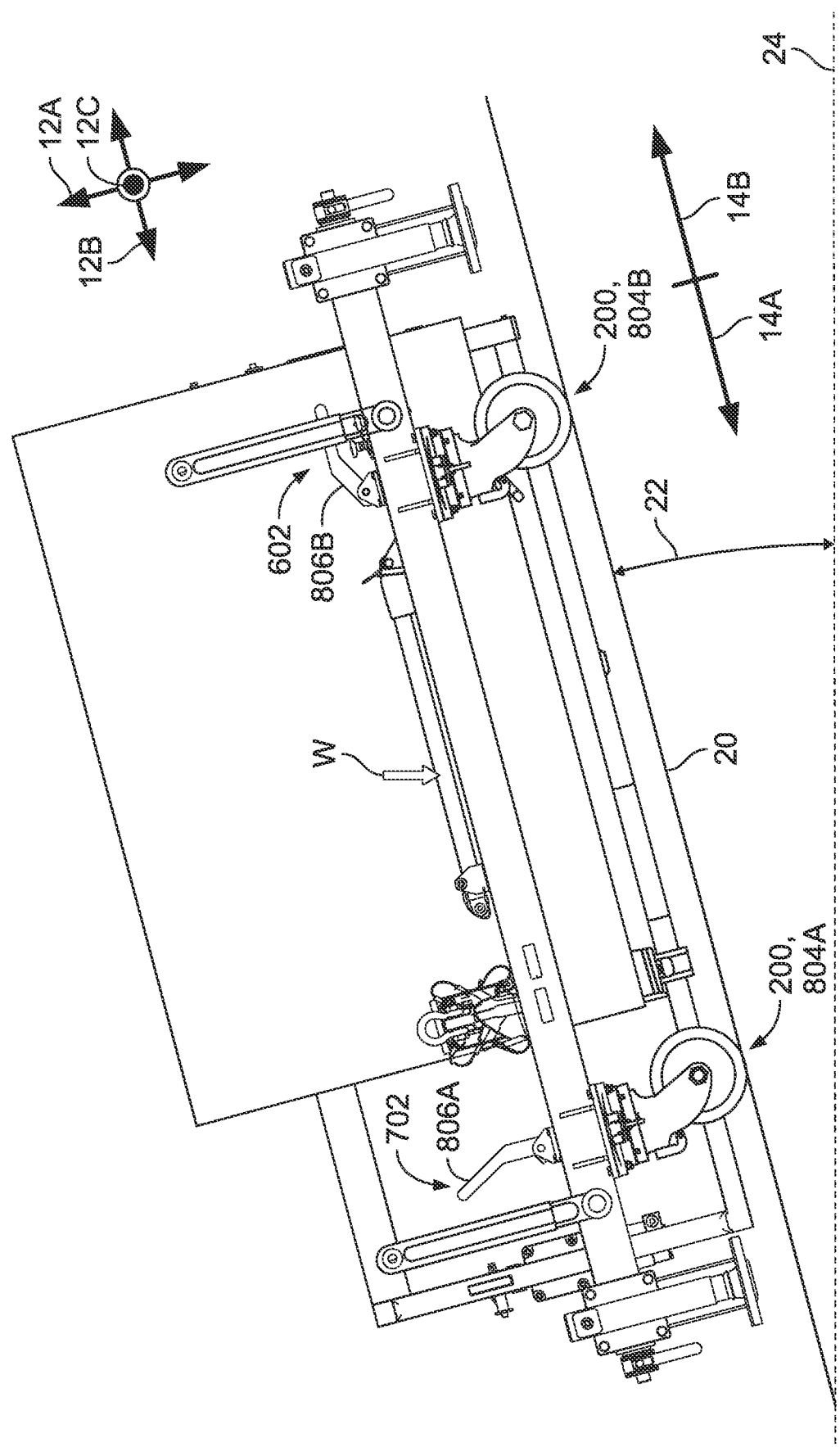
FIG. 10 is a side view of the example engine transportation system of FIG. 9 shown on an example inclined surface.

FIG. 10 is a side view of the example engine installation system 900 of FIG. 9 shown on an inclined surface 20. As shown in FIG. 10, the inclined surface 20 is angled, sloped, or uneven based on surrounding conditions affecting the surface 20. For example, the engine installation system 900 can be located on an aircraft carrier flight deck, which may tilt, or sway, based on waves or other sea conditions. In the illustrated example, the inclined surface 20 is tilted at an angle 22 relative to a horizontal reference line 24.

As mentioned, the transport dolly 100 includes the plurality of caster assemblies 200. In the illustrated example, at least the first caster assembly 804A is in the released position 700 and at least the second caster assembly 804B is in the engaged position 600. More specifically, in the illustrated example of FIG. 10, the first lever arm 806A is in the second position 702, and the second lever arm 806B is in the first position 602. Additionally or alternatively, the third caster assembly 804C (FIG. 8) is in the released position 700, and the fourth caster assembly 804D (FIG. 8) is in the engaged position 600 to prevent movement of the transport dolly 100 along (e.g., down) the inclined surface 20.

In some examples, the transport dolly 100 can support the weight W of the engine 902 on the inclined surface 20 and remain stationary due to engagement of two of the caster assemblies 200 (e.g., the second and fourth caster assemblies 804B, 804D). In some examples, an angle 22 of the ground surface 10 is fifteen degrees. In other examples, the angle 22 is greater than fifteen degrees. In such examples, the transport dolly 100 is capable of remaining stationary and supporting the weight W up to a first threshold angle (e.g., 20 degrees, 25 degrees, etc.) with two of the caster assemblies 200 in the engaged position 600 and two of the caster assemblies 200 in the released position 700. In some examples, the transport dolly 100 is capable of remaining stationary and supporting the weight W up to a second threshold angle (e.g., 30 degrees, 45 degrees, etc.) greater than the first threshold angle when all (e.g., all four) of the caster assemblies 200 are in the engaged position 600.

Example caster assemblies for restricting movement of transport dollies are disclosed herein. Disclosed caster assemblies include a lever arm mounted on a dolly frame of the transportation dolly with a cam at one end to remotely move a brake arm into an engaged position. The cam interfaces with a pin, and the pin interfaces with both the cam and the brake arm. As such, the cam, the pin, and the brake arm define a mechanical linkage. Thus, when the lever arm is raised, the cam allows the brake arm to release from the wheel. Alternatively, when the lever arm is lowered, the cam applies a compressive force on the pin, which causes the brake arm to engage the wheel.

Disclosed caster assemblies apply greater compressive forces on the brake arm, which improves engagement performance and movement restriction of the wheel. For example, the cam and the pin have certain properties (e.g., shape, length, diameter, material, etc.) to ensure the compressive force causes the brake arm to sufficiently engage the wheel. Furthermore, the length of example lever arms is increased relative to pedals of conventional caster brakes, which corresponds to greater torque and greater compressive force on the brake arm when the operator applies a given force on the lever arm. Additionally, disclosed caster assemblies are easier to engage in view of certain tactile and visual feedback associated with the lever arm and/or the cam. For example, the lever arm is coupled to the dolly frame, which the operator can access by hand with relative ease. Moreover, disclosed caster assemblies include fewer components that are prone to wear or failure. For example, the lever arm, the cam, and the pin are the primary sources of the compressive force that causes the brake arm to engage the wheel, and such components have increased durability, reduced mechanical complexity, improved reliability, etc.

Example methods, apparatus, systems, and articles of manufacture to remotely actuate a brake of a caster assembly using a lever arm having a cam surface are disclosed herein. Further examples and combinations thereof include the following:

Example 1 includes a caster assembly comprising a caster frame assembly including a caster frame, a caster mounting plate, and a brake arm, the caster frame rotatably coupled to the caster mounting plate to enable a wheel to swivel relative to the caster mounting plate, the brake arm rotatably coupled to the caster frame, the brake arm to engage the wheel when the brake arm is in an engaged position, a pin having a first end and a second end opposite the first end, the second end to engage the brake arm, and a lever arm having a third end and a fourth end opposite the third end, the lever arm to pivot relative to the caster frame assembly between a first position and a second position, movement of the lever arm to the first position to cause the fourth end of the lever arm to actuate the pin in a first direction to move the brake arm to the engaged position to restrict rotation of the wheel, movement of the lever arm to the second position to cause the fourth end of the lever arm to actuate the pin in a second direction to move the brake arm to a released position to enable rotation of the wheel, the second direction opposite the first direction.

Example 2 includes the caster assembly of example 1, wherein the fourth end of the lever arm includes a cam to engage the pin.

Example 3 includes the caster assembly of any of examples 1 or 2, wherein the caster frame assembly includes a brake arm bracket coupled to the caster frame, the brake arm rotatably coupled relative to the caster frame via the brake arm bracket.

Example 4 includes the caster assembly of any of examples 1-3, wherein the lever arm includes a base portion defining the fourth end and a handle portion defining the third end, the handle portion oriented at an angle relative to the base portion.

Example 5 includes the caster assembly of any of examples 1-4, wherein the angle is between 25 degrees and 35 degrees.

Example 6 includes the caster assembly of any of examples 1-5, wherein the base portion has a longitudinal axis that is oriented (i) non-parallel relative to a swivel axis of the caster frame when the brake arm is in the engaged position and (ii) substantially parallel relative to the swivel axis of the caster frame when the brake arm is in the released position.

Example 7 includes the caster assembly of any of examples 1-6, wherein the pin includes a first portion having a first diameter and a second portion having a second diameter less than the first diameter.

Example 8 includes the caster assembly of any of examples 1-7, wherein the first portion extends between the first end of the pin and a transitional portion of the pin, and the second portion extends between the second end of the pin and the transitional portion, the transitional portion positioned between the first end and the second end and defines a tapered surface between the first diameter and the second diameter.

Example 9 includes the caster assembly of any of examples 1-8, wherein the pin is made of beryllium copper.

Example 10 includes the caster assembly of any of examples 1-9, wherein the brake arm includes a buffer pad, and the second end of the pin engages the buffer pad to move the brake arm into the engaged position, the buffer pad made of stainless steel.

Example 11 includes a transport dolly comprising a dolly frame, and a plurality of caster assemblies, the caster assemblies each including a wheel, a caster frame assembly including a caster frame and a brake arm, the wheel coupled to the caster frame, the brake arm rotatably coupled to the caster frame, the brake arm to rotate between an engaged position and a released position, the brake arm to engage the wheel when in the engaged position to restrict rotation of the wheel relative to the caster frame, the brake arm to disengage the wheel when in the released position to enable rotation of the wheel relative to the caster frame, a pin having a first end extending at least partially through the dolly frame and a second end opposite the first end extending at least partially through the caster frame, and a lever arm rotatably coupled to the dolly frame, the lever arm including a handle and a cam, the lever arm to move the brake arm between an engaged position to restrict rotation of the wheel relative to the dolly frame and a released position to enable rotation of the wheel relative to the dolly frame via the cam and the pin when the lever arm is rotated relative to the dolly frame.

Example 12 includes the transport dolly of example 11, wherein the a first portion of the pin is disposed within the dolly frame and is supported by at least one bushing.

Example 13 includes the transport dolly of any of examples 11-12, wherein the caster frame assembly includes a caster mounting plate, further including a dolly frame assembly including a dolly mounting plate coupled to the dolly frame, the caster mounting plate coupled to the dolly mounting plate.

Example 14 includes the transport dolly of any of examples 11-13, wherein the lever arm is coupled to the dolly frame via a clevis joint, the clevis joint including a bracket and a hinge pin, the hinge pin extending through the bracket and the lever arm.

Example 15 includes the transport dolly of any of examples 11-14, wherein the cam engages the first end of the pin, and the second end of the pin engages the brake arm.

Example 16 includes the transport dolly of any of examples 11-15, wherein rotation of the lever arm relative to the dolly frame in a first rotational direction is to cause the cam to actuate the pin such that the brake arm moves to an engaged position to restriction rotation of the wheel.

Example 17 includes the transport dolly of any of examples 11-16, wherein rotation of the handle relative to the dolly frame in a second rotational direction opposite the first rotational direction is to cause the cam to actuate the pin such that the brake arm moves to a released position to enable rotation of the wheel.

Example 18 includes the transport dolly of any of examples 11-17, wherein the plurality of the caster assemblies includes at least one of a first caster assembly, a second caster assembly, a third caster assembly, and a fourth caster assembly.

Example 19 includes an apparatus comprising means for rotatably supporting a wheel, means for locking rotation of the wheel operatively coupled to the means for rotatably supporting the wheel, means for moving the means for locking rotation between a engaged position to restrict movement of the wheel and a released position to enable rotation of the wheel, and means for operating the means for locking rotation, the means for operating rotatably coupled relative to the means for rotatably supporting the wheel, rotation of the means for operating between a first position and a second position to cause the means for locking rotation to move between the engaged position and the released position via the means for moving.

Example 20 includes the apparatus of example 19, further including means for pivotally mounting the wheel to a frame to enable the wheel to rotate relative to the frame about a swivel axis.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A caster assembly comprising:
a caster frame assembly including a caster frame, and a caster mounting plate, the caster frame rotatably coupled to the caster mounting plate to enable a wheel to swivel relative to the caster mounting plate, the caster frame assembly including a swivel lock adjustable between an unlocked condition to enable the wheel to swivel relative to the mounting plate and a lock condition to prevent the wheel from swiveling relative to the mounting plate, the caster assembly including a wheel lock that operates independently from the swivel lock, the wheel lock including:
a brake arm rotatably coupled to the caster frame, the brake arm to engage the wheel when the brake arm is in an engaged position;
a pin having a first end and a second end opposite the first end, the second end to engage the brake arm; and
a lever arm having a third end and a fourth end opposite the third end, the lever arm to pivot relative to the caster frame assembly between a first position and a second position, movement of the lever arm to the first position to cause the fourth end of the lever arm to actuate the pin in a first direction to move the brake arm to the engaged position to restrict rotation of the wheel, movement of the lever arm to the second position to cause the fourth end of the lever arm to actuate the pin in a second direction to move the brake arm to a released position to enable rotation of the wheel, the second direction opposite the first direction.

2. The caster assembly of claim 1, wherein the fourth end of the lever arm includes a cam to engage the pin.

3. The caster assembly of claim 1, wherein the caster frame assembly includes a brake arm bracket coupled to the caster frame, the brake arm rotatably coupled relative to the caster frame via the brake arm bracket.

4. The caster assembly of claim 1, wherein the lever arm includes a base portion defining the fourth end and a handle portion defining the third end, the handle portion oriented at an angle relative to the base portion.

5. A caster assembly comprising:
a caster frame assembly including a caster frame, a caster mounting plate, and a brake arm, the caster frame rotatably coupled to the caster mounting plate to enable a wheel to swivel relative to the caster mounting plate, the brake arm rotatably coupled to the caster frame, the brake arm to engage the wheel when the brake arm is in an engaged position;
a pin having a first end and a second end opposite the first end, the second end to engage the brake arm; and
a lever arm having a third end and a fourth end opposite the third end, the lever arm to pivot relative to the caster frame assembly between a first position and a second position, the lever arm includes a base portion defining the fourth end and a handle portion defining the third end, the handle portion oriented at an angle relative to the base portion, the angle being between 25 degrees and 35 degrees.

6. The caster assembly of claim 1, wherein the pin includes a first portion having a first diameter and a second portion having a second diameter less than the first diameter.

7. The caster assembly of claim 6, wherein the first portion extends between the first end of the pin and a transitional portion of the pin, and the second portion extends between the second end of the pin and the transitional portion, the transitional portion positioned between the first end and the second end and defines a tapered surface between the first diameter and the second diameter.

8. The caster assembly of claim 1, wherein the pin is made of beryllium copper.

9. The caster assembly of claim 8, wherein the brake arm includes a buffer pad, and the second end of the pin engages the buffer pad to move the brake arm into the engaged position, the buffer pad made of stainless steel.

10. A transport dolly comprising:
a dolly frame; and
a plurality of caster assemblies, the caster assemblies each including:
a wheel;
a caster frame assembly including a caster mounting plate, a caster frame and a brake arm, the wheel coupled to the caster frame, the brake arm rotatably coupled to the caster frame, the brake arm to rotate between an engaged position and a released position, the brake arm to engage the wheel when in the engaged position to restrict rotation of the wheel relative to the caster frame, the brake arm to disengage the wheel when in the released position to enable rotation of the wheel relative to the caster frame;
a first pin having a first end extending at least partially through the dolly frame and a second end opposite the first end extending at least partially through the caster frame;
a lever arm rotatably coupled to the dolly frame, the lever arm including a handle and a cam, the lever arm to move the brake arm between an engaged position to restrict rotation of the wheel relative to the dolly frame and a released position to enable rotation of the wheel relative to the dolly frame via the cam and the first pin when the lever arm is rotated relative to the dolly frame;
a first sleeve to couple to the caster mounting plate;
a second sleeve to couple to the caster frame; and
a second pin to couple to the first sleeve and the second sleeve when the first sleeve is radially aligned with the second sleeve, the second pin to fix a swivel position of the wheel when the second pin is coupled to the first sleeve and the second sleeve.

11. The transport dolly of claim 10, wherein a first portion of the first pin is disposed within the dolly frame and is supported by at least one bushing.

12. The transport dolly of claim 10, wherein the caster frame assembly includes a caster mounting plate, further including a dolly frame assembly including a dolly mounting plate coupled to the dolly frame, the caster mounting plate coupled to the dolly mounting plate.

13. The transport dolly of claim 10, wherein the lever arm is coupled to the dolly frame via a clevis joint, the clevis joint including a bracket and a hinge pin, the hinge pin extending through the bracket and the lever arm.

14. The transport dolly of claim 13, wherein the cam engages the first end of the first pin, and the second end of the first pin engages the brake arm.

15. The transport dolly of claim 14, wherein rotation of the lever arm relative to the dolly frame in a first rotational direction is to cause the cam to actuate the first pin such that the brake arm moves to an engaged position to restriction rotation of the wheel.

16. The transport dolly of claim 15, wherein rotation of the handle relative to the dolly frame in a second rotational direction opposite the first rotational direction is to cause the cam to actuate the first pin such that the brake arm moves to a released position to enable rotation of the wheel.

17. The transport dolly of claim 10, wherein the plurality of the caster assemblies includes at least one of a first caster assembly, a second caster assembly, a third caster assembly, and a fourth caster assembly.

18. The transport dolly of claim 10, wherein the first pin operates independently from the second pin.

19. The caster assembly of claim 5, wherein movement of the lever arm to the first position to cause the fourth end of the lever arm to actuate the pin in a first direction to move the brake arm to the engaged position to restrict rotation of the wheel, movement of the lever arm to the second position to cause the fourth end of the lever arm to actuate the pin in a second direction to move the brake arm to a released position to enable rotation of the wheel, the second direction opposite the first direction.

20. The caster assembly of claim 19, wherein the base portion has a longitudinal axis that is oriented (i) non-parallel relative to a swivel axis of the caster frame when the brake arm is in the engaged position and (ii) substantially parallel relative to the swivel axis of the caster frame when the brake arm is in the released position.

\* \* \* \* \*